Jan. 1, 1957
C. N. BATES
2,776,133
VEHICULAR BEAM SCALE
Filed March 22, 1951
8 Sheets-Sheet 1
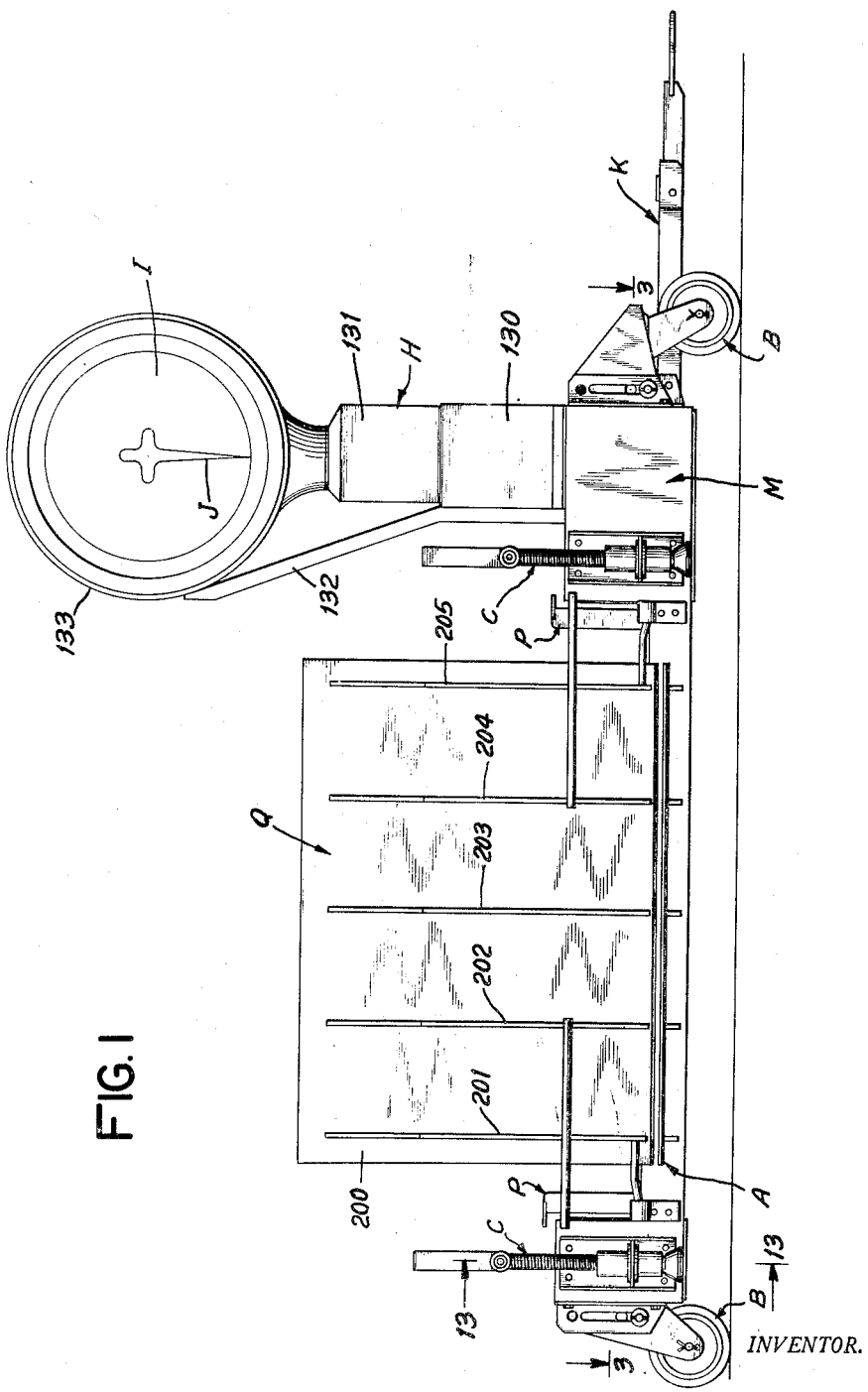
FIG. I
INVENTOR.
CLYDE N. BATES
BY
ATTORNEY.

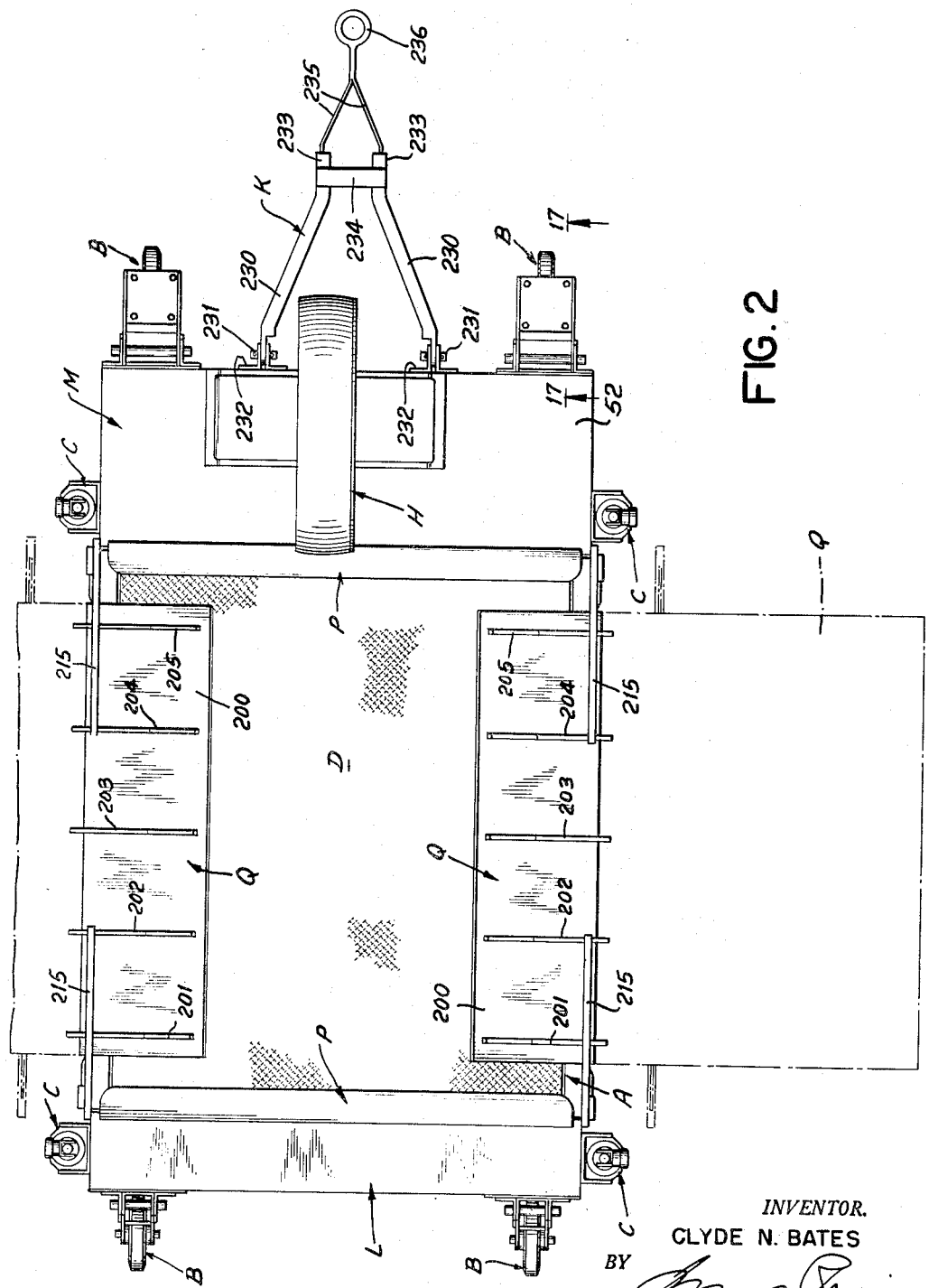

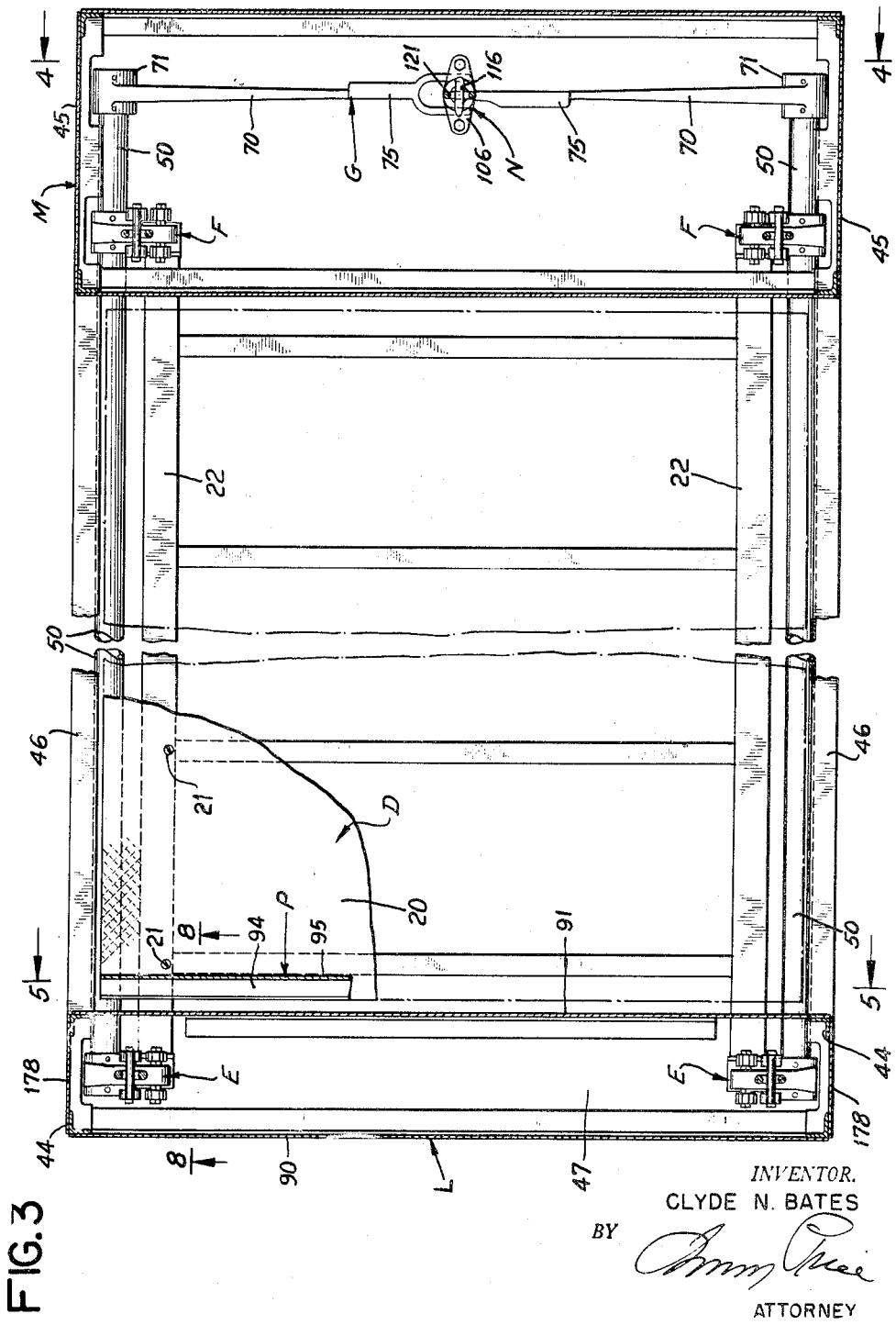

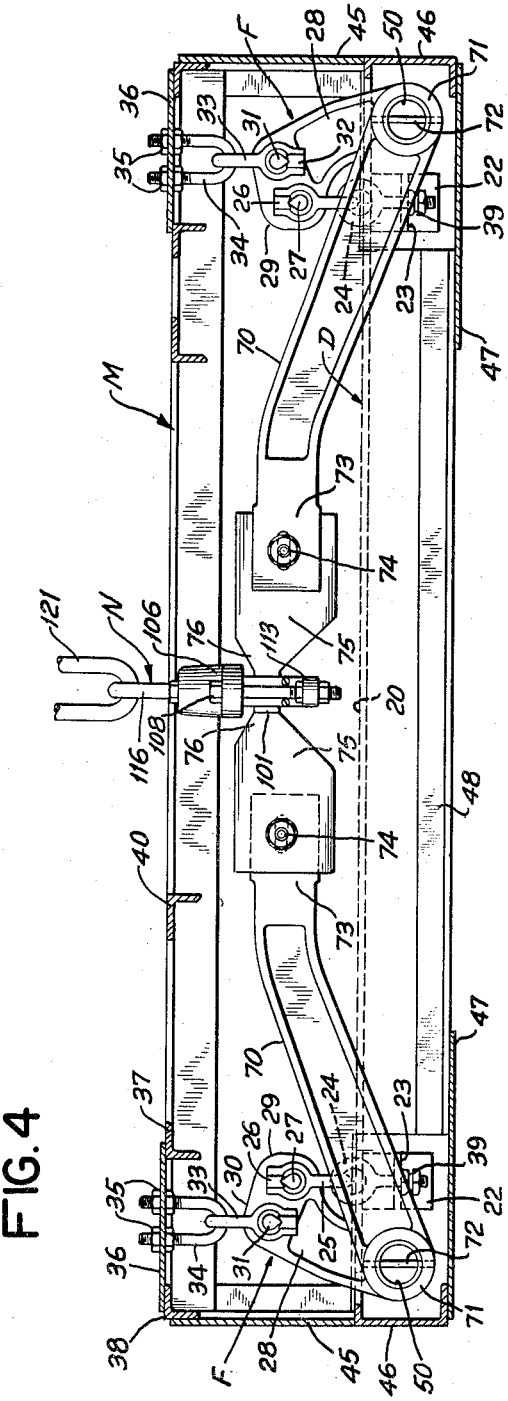

Jan. 1, 1957  C. N. BATES  2,776,133
VEHICULAR BEAM SCALE
Filed March 22, 1951  8 Sheets-Sheet 5

INVENTOR.
CLYDE N. BATES
BY
ATTORNEY.

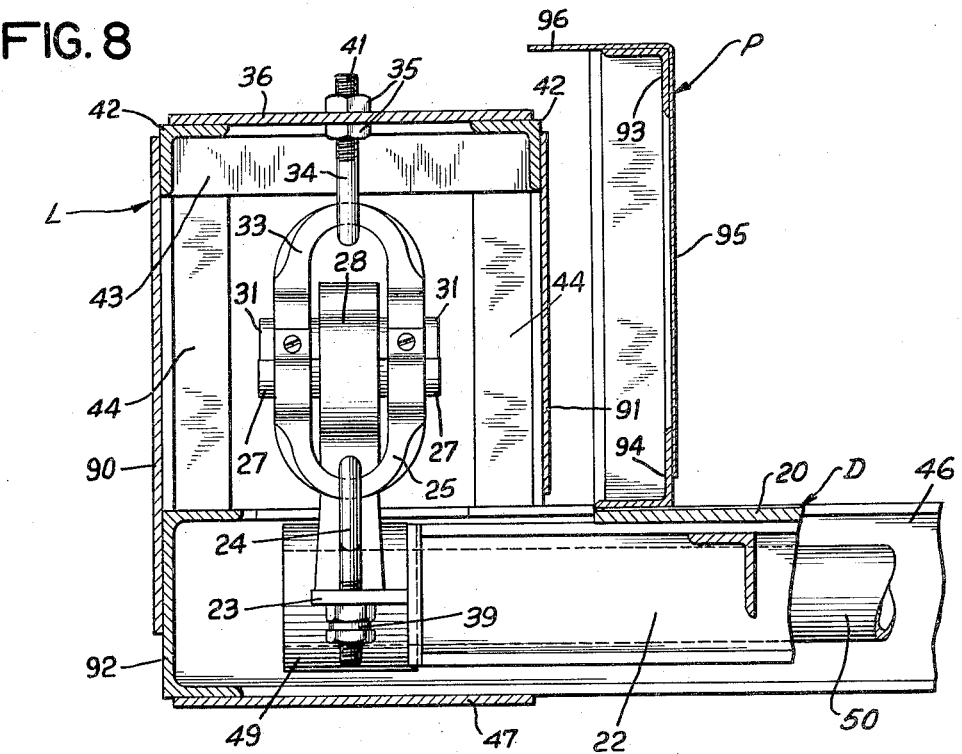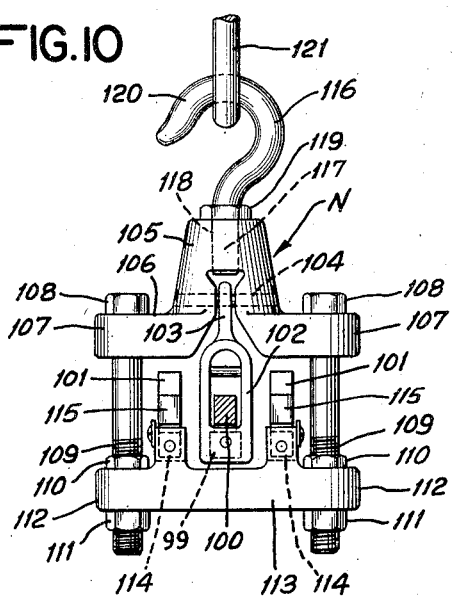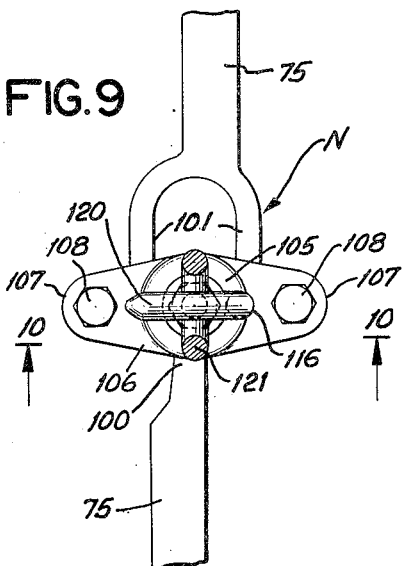

Jan. 1, 1957 C. N. BATES 2,776,133
VEHICULAR BEAM SCALE
Filed March 22, 1951 8 Sheets-Sheet 7
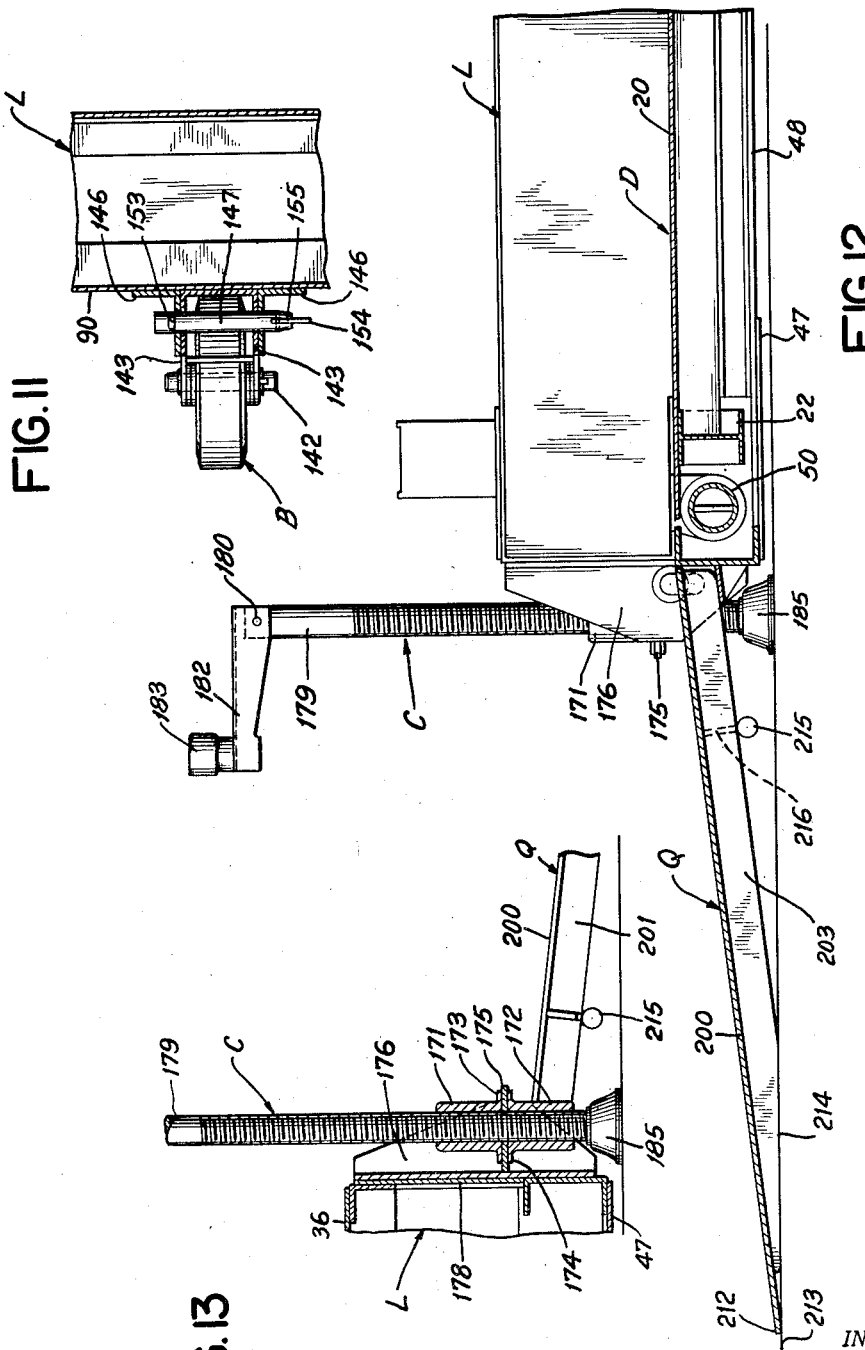
INVENTOR.
CLYDE N. BATES
BY 
ATTORNEY.

Jan. 1, 1957 C. N. BATES 2,776,133
VEHICULAR BEAM SCALE
Filed March 22, 1951 8 Sheets-Sheet 8
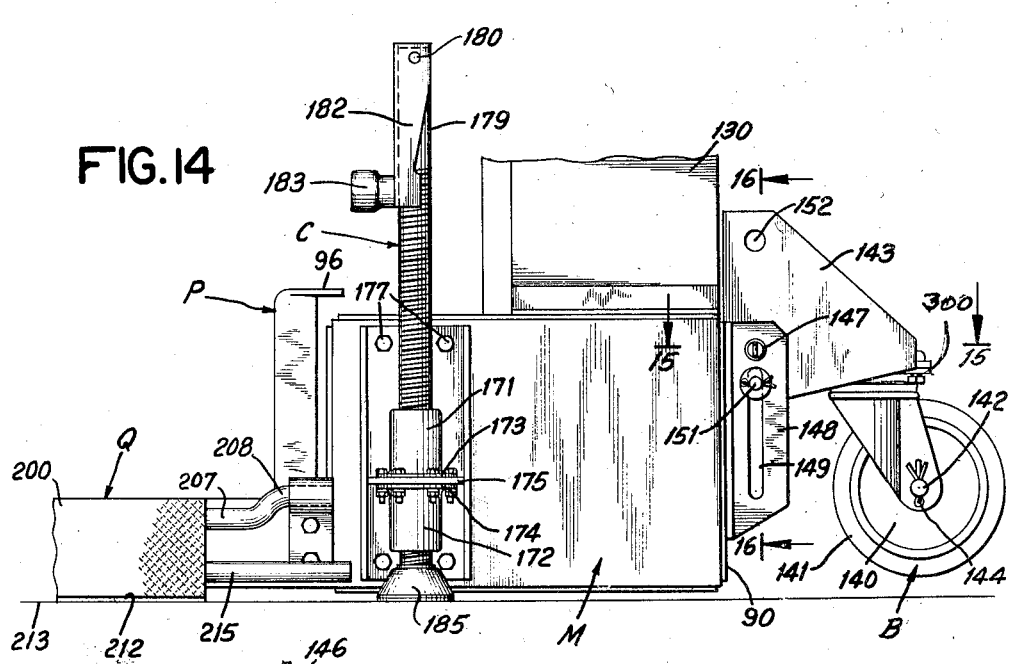
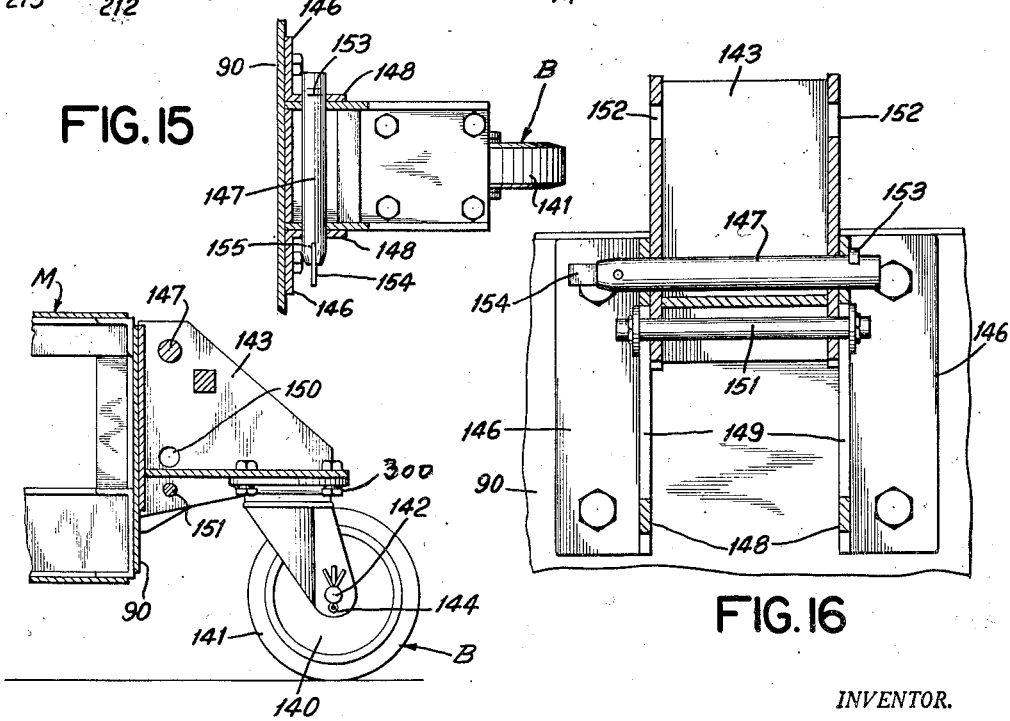
INVENTOR.
CLYDE N. BATES
BY
ATTORNEY.

United States Patent Office 2,776,133
Patented Jan. 1, 1957

2,776,133

VEHICULAR BEAM SCALE

Clyde N. Bates, Rutland, Vt., assignor, by mesne assignments, to The Howe Scale Company, Rutland, Vt., a corporation of Delaware Application March 22, 1951, Serial No. 217,013

2 Claims. (Cl. 265—27)

The present invention relates to a vehicular beam scale.

In the drawings:

Fig. 1 is a side elevational view of the vehicular beam scale according to the present invention, with inclines in elevated position and the scale ready for movement with the wheels down.

Fig. 2 is a top plan view of the scale as shown in Fig. 1.

Fig. 3 is a transverse horizontal sectional view upon the line 3—3 of Fig. 1.

Fig. 4 is a transverse vertical sectional view upon the line 4—4 of Fig. 3.

Fig. 5 is a transverse vertical sectional view upon the line 5—5 of Fig. 3.

Fig. 8 is a fragmentary transverse sectional view upon the line 8—8 of Fig. 3.

Fig. 9 is a top plan view of the center shackle arrangement.

Fig. 10 is a side elevational view partly in section taken upon the line 10—10 of Fig. 9.

Fig. 11 is a top plan view of one end of the scale.

Fig. 12 is a transverse sectional view showing one of the sides of the scale.

Fig. 13 is a transverse vertical sectional view upon the line 13—13 of Fig. 1.

Fig. 14 is a fragmentary side elevational view of the forward end of the scale as shown in Fig. 1.

Fig. 15 is a fragmentary horizontal sectional view upon the line 15—15 of Fig. 14.

Fig. 16 is a vertical transverse sectional view upon the line 16—16 of Fig. 14 on an enlarged scale as compared to Fig. 14.

Fig. 17 is a vertical transverse sectional view of the forward swivel adjustable wheel carrier of Figs. 14 to 16, showing the interior construction.

Figures 6, 7:
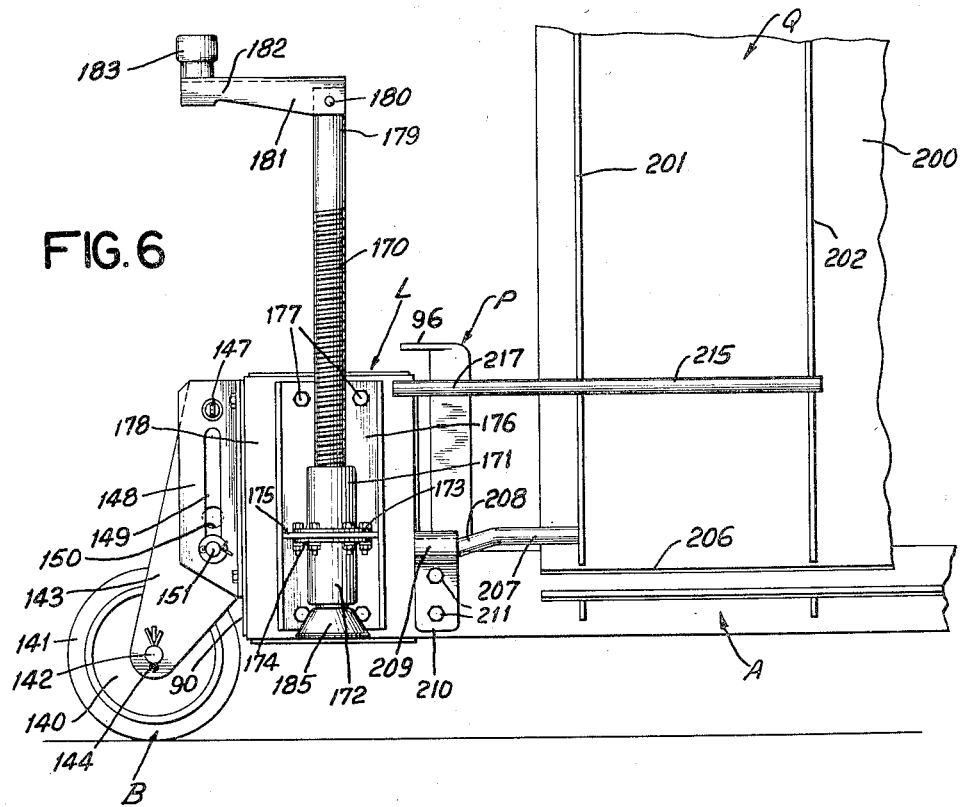
Fig. 6 is a vertical elevational view of the scale.
Fig. 7 is a view similar to Fig. 6, but illustrating the wheels in elevated position and the leveling posts in down position.

Referring to Figs. 1, 2 and 3, there is shown a main frame A supported when moving upon the rubber-tired wheels B, and supported when in fixed position upon the leveling posts C.

The platform D is mounted upon the levers E and F, which are connected through the levers G to the upright H. The upright H has a dial I and a pointer J to measure the weight in question.

The scale is provided with a drawbar arrangement K.

Referring specifically to the platform D, as shown particularly in Fig. 3, the platform consists of a checkered or other roughened steel plate 20 which is mounted by flat head screws 21 to the longitudinal beams 22.

The beams 22 are of I cross section, as shown best in Fig. 5, and at their far ends are connected to the extensions 23, which in turn connect with the eye bolts 24.

The eye bolts 24 in turn are connected with the compensation loops 25, which at their upper ends are provided with the bearing arrangements 26 engaging the knife edges 27 projecting laterally from the levers 28. The knife edges 27 are mounted near the forward nose 29 of the levers 28. At the peak 30 of the levers 28 the downwardly directed knife edge elements 31 press against the contact blocks 32, which are held by the compensating loops 33.

These loops 33 engage the U-shaped element 34 which is adjustably mounted by the nuts 35 upon the plate 36.

As shown in Fig. 4, the plate 36 extends across from the angle member 37 to the angle member 38 forming part of the frame A, and it acts to suspend the lever 28.

The levers 28 at the far end or left end of the scale structure, as shown in Figs. 1 and 3, are positioned within the far box L.

As shown in Fig. 5, the far box L has the side plate members 45 which extend upwardly from the inturned U-beams 46. The U-beams 46 have the inwardly-turned bottom plates 47 which are mounted to the transverse inverted T-beam member 48 forming part of structure A.

The lower end of the levers 28 are provided with the hubs 49 in which are fixed the tubes 50 by the pins 51. At the near end of the scale the box M will be positioned directly under the upright H.

As shown in Fig. 4, the levers 28 will be suspended from the plates 36 by the U-shackles 34 and the knife edges 31. The forward ends 29 of the levers 28 will carry the platform 20 by the knife edges 27 and the eye bolts 24.

The eye bolts 24, as shown in Fig. 4, are provided with the adjustable lock nut connection 38 to the extension 23 of the I-beam 22.

As shown best in connection with the forward box M of Fig. 4, the angle beams 37, 38 and 40 will form a top structure for the box M upon which the upright H is supported, upon which may be mounted the plate 52, as shown in Fig. 2.

As shown best in Fig. 4, the side plates 45 extend upwardly from the channels 46 as is also shown in Fig. 5.

The bottom plates 47 in Fig. 5 also extend inwardly from the lower flange of the channels 46 and support the cross or trasverse inverted T beam member 48.

The lower ends of the levers 28 in Fig. 4 are mounted on the tubes 50 by pins 51.

In the box M will be positioned the levers 70 by the hubs 71 and the pins 72. The hubs 71 will turn with the tubes 50 as the platform 20 is lowered when a weight is placed thereon. When the platform is lowered, the lower ends of the levers 28 swing outwardly upon the knife edge mounts 31.

The levers 70 have their ends 73 connected at 74 to the outwardly extending bar 75. The inside ends 76 of the bar member 75 are connected to the center suspension shackle N.

The levers E and F are shown in relatively larger scale than Fig. 8 which shows the far box L.

As indicated in Fig. 8, the far box L has a top plate 36 which carries the threaded shanks 41 of the U bracket 34 by the nuts 35. The plate is supported at the box L by the transverse angle beams 42 which are supported upon the transverse structure 44. The side plates 90 and 91 extend down to the frame A.

The end of the frame, as shown in Fig. 8, has the transverse angle beam 92 which connects with the longitudinal U-shaped members 46 as shown in Figs. 4 and 5.

The platform 20 is provided with the upstanding aprons P to protect the boxes L and M from being struck by the wheelbarrows which are used for bringing the bales onto the platform.

The aprons P consist of the angle members 93 and 94 with the sheet plate member 95, which extends outwardly at 96 over the box L, as in Fig. 8, and also over the box M adjacent the upright H, as in Fig. 1.

As shown in enlarged scale in Figs. 9 and 10, the shackle in the scale box M transmits the movement of the platform 20 through the levers 28 and the tube 50 and the levers 70 with their end portions 75. In Fig. 9 one end portion has a single member 100 which fits between the clevis jaws 101 of the other member 75.

The member 100 is provided with a knife edge which rests upon the pad 101 in the bottom of the link 102. The upper end of the link 102 has the eye 103 which engages the pin 104. The pin 104 extends through the boss 105 on the top of the bracket member 106. The bracket member 106 has the outstanding lateral wings 107 which carry the bolts 108.

The bolts 108 at their lower ends are threaded at 109, and receive the nuts 110 and 111, which engage the wings 112 of the lower bracket 113.

The bracket 113 has the pads 114 which receive the knife edges 115 on the ends of the clevis jaws 101.

From the top structure 105 of the shackle N extends the hook 116. This hook 116 has the threaded shank 117 which screws into the opening 118 and is provided with the lock nut 119. The hook portion 120 engages the loop 121 by which the pointer J is turned upon the dial I.

In Fig. 1 the upright H has a lower support box 130 and an upper support box 131.

The tare bar and scale beam are normally positioned in the upper box 131. The brace beam 132 extends from the dial housing 133 to the lower box 130 and to the box M.

The wheel is shown in Figs. 6, 7 and 11. The wheel body 140 has a rubber tire 141 and is mounted upon the pivot pin 142. The pivot pin 142 is held in position in the side plates 143 by the separated pins 144. The plates 143 slide within the bracket member 145 which consists of two angle members 146 mounted upon the plate 90 at the end of the box L.

The pin 147 holds the wheel either in elevated, inactive position, as shown in Fig. 7, or in lowered active position, as shown in Fig. 6. The slide plates 148 of the angle members 146 are provided with the vertical slots 149. When the wheels B are in elevated position, the guide pin 151 will be in the top of the slot 149 with the pin 147 extending through the opening 150 in the side members 143.

When the wheel B is lowered, the pin 151 will be positioned at the lower part of the slot 149 and the pin 147 will be inserted through the opening 152 in the side plates 143. The pin 147 has a projection 153 (Fig. 11) to hold it in position on the outside of the plate 148 of the angle member 146, and at its other end it has a tang or extension 154 fitted into the slot 155. The member 154 permits the pin to be withdrawn or removed or locked in position, as the case may be, to hold the wheel in either lower or elevated position, as shown in Figs. 6 and 7.

The screw posts 170 are shown in side view in Figs. 6 and 7 respectively in elevated and lower position.

These posts 170 consist of an elongated screw shank which is threaded through the upper sleeve 171 and the lower sleeve 172. These sleeves are mounted by the brackets 173 and 174 upon the plate 175.

The plate 175 is mounted upon the base plate 176 which is attached by the bolts 177 upon the end plates 178 of the box L.

The upper ends of the shank 179 are unthreaded and they have a pivot connection 180 to the U extension 181 of the handle member 182. The handle member 182 may be elevated by the knob 183 to the position shown in Fig. 6 to enable the screw member to be moved upwardly or downwardly in the threaded sleeves 171 and 172.

The lower end of the shank 170 carries the rubber foot 185 which is desired to be clamped against the floor by turning of the handle 182 with elevation of the frame A to level position. This rubber foot 185 is shown clamped to the floor in lowered position in Figs. 7, 12 and 13.

The inclines Q shown in Figs. 6, 7, 12 and 13 are hinged on the side of the frame A and when lowered, as shown in Figs. 7, 12 and 13, permit heavy bales to be rolled upon the platform D.

When the scale is being moved, these inclines Q, as shown in Figs. 1, 2 and 6, are elevated over the platform D.

These inclines Q consist of the plates 200, preferably of the same thickness as the platform 20, for example ¼ inch steel plate with a checkered face. The inclines Q are provided with the reenforcing webs 201, 202, 203, 204 and 205 shown in Figs. 1 and 6.

At the edge 206 of the inclines Q adjacent the platform 20 there is an offset pivot rod member 207 which is inclined as indicated at 208 (see Fig. 6) and fits in the bearing eye 209 of the bracket 210. The bracket 210 is bolted at 211 to the frame A.

The ends 210 of the incline (see Fig. 12) contact the floor at 213 and the fins or webs 201 to 205 are chamfered off as indicated at 214, so as to give a better support upon the floor at 213. The rod 215 which has a web support at 216 (see Fig. 12) projects beyond the inclines Q at 217, and acts as a stop when it strikes the boxes L and M or the protective aprons P.

The yoke K, shown in Figs. 1 and 2, consists of two side members 230 of U-shaped cross section which have pivotal connections at 231 to the brackets 232 on the front plate of the scale box M. The U beams 230 converge toward their end portions 233 where they are connected by the cross bar 234. The cross bar 234 has the hitch member 235 which terminates in a towing ring 236.

In operation the vehicular beam scale may be readily transferred from the portable condition of Fig. 6 to the fixed position of Fig. 7 by changing the position of the pin 147 between the openings 150 and 152. At the same time the screw posts 170 may be turned by the metal cranks 182 to lift and level the frame A as well as the platform D.

In the arrangement shown the front wheel connections are preferably swivel casters whereas the rear wheel connections are rigid. Both the rigid and swivel connections slide up and down and may be securely locked in lowered position of Fig. 6 or in elevated position of Fig. 7. The screw posts 170 are readily changed from the position of Fig. 6 to Fig. 7 by turning the handle 182 of the knob 183.

The construction of the forward adjustable post C and the wheels B, as shown in Figs. 14, 15, 16 and 17, is the same as the construction of the rear fixed wheels at the left of Fig. 1 and is shown in greater detail in Figs. 6, 7 and 11. The side braces 143 position the wheels B, as shown in Figs. 14 to 17, a greater distance away from the scale box M so as to permit a swinging movement on the swivel mount 309.

The posts C permit the frame A to be lifted off the wheels B so that the wheels may be engaged either in their upper or lower position, depending upon whether the scale is to be used in situ or is to be transported.

The frame A is firmly braced by the angle members 46 and 48 as well as by the boxes L and M so as to withstand rough handling.

Having now particularly described and ascertained the nature of the invention, and in what manner the same is to be performed, what is claimed is:

1. A portable vehicular scale comprising a portable rectangular frame having a far end and a near end and a longitudinal axis extending from the far end to the near end, a rectangular platform vertically reciprocably supported above said frame, pairs of levers pivotally connected to the frame at each end of the frame and in turn pivotally connected to said platform and positioned at both the far end and the near end and extending in a direction transverse to said longitudinal axis at the far end and the near end of the frame, tubes extending longitudinally at each side of the frame between the far end and the near end and being parallel to the longitudinal axis of the frame and being positioned below the platform and connecting the levers at the far end and the near end so that said levers will move together when a weight is placed upon the platform and the platform is depressed and means connected to the levers at the near end to actuate an indicator to indicate the weight.

2. The scale of claim 1 in which the levers are four in number and each lever is suspended at an intermediate point from the frame, and at one end has a suspension to the platform and at the other end is connected to one of the tubes.

References Cited in the file of this patent

UNITED STATES PATENTS

| Number | Name | Date |
|---|---|---|
| 99,169 | Dewey | June 25, 1870 |
| 148,456 | Hetfield | Mar. 10, 1874 |
| 231,838 | Moro | Aug. 31, 1880 |
| 303,300 | Lombard | Aug. 12, 1884 |
| 344,762 | Witherell | June 29, 1886 |
| 433,516 | Charles | Aug. 5, 1890 |
| 740,109 | Edgar | Sept. 29, 1903 |
| 748,246 | Williams | Dec. 29, 1903 |
| 810,517 | Zeidler | Jan. 23, 1906 |
| 823,728 | Hughes | June 19, 1906 |
| 1,082,160 | Kurowski | Dec. 23, 1913 |
| 1,335,604 | Rogers | Mar. 30, 1920 |
| 1,340,418 | Schneider | May 18, 1920 |
| 1,410,193 | Klemm | Mar. 21, 1922 |
| 1,623,137 | Strachan | Apr. 5, 1927 |
| 1,667,717 | Brinton | May 1, 1928 |
| 1,880,398 | Bennett | Oct. 4, 1932 |
| 2,450,281 | Hudson | Sept. 28, 1948 |

FOREIGN PATENTS

| Number | Country | Date |
|---|---|---|
| 321,596 | Great Britain | Nov. 14, 1929 |
| 47,873 | Denmark | Oct. 16, 1933 |
| 133,316 | Australia | July 14, 1949 |

OTHER REFERENCES

"Industrial Weighing," by D. M. Considine, published 1948 by Reinhold Publishing Company, 330 West 42nd Street, New York. Chapter 12 of interest.